(12) United States Patent
Harker

(10) Patent No.: US 6,823,475 B1
(45) Date of Patent: Nov. 23, 2004

(54) PC-CPU MOTHERBOARDS WITH COMMON FAULT-TOLERANT POWER SUPPLY

(76) Inventor: Robin Harker, 30 Hollybush Lane, Amersham, Buckinghamshire HP6 6EB (GB)

( * ) Notice: Subject to any disclaimer, the term of this patent is extended or adjusted under 35 U.S.C. 154(b) by 409 days.

(21) Appl. No.: 09/711,983

(22) Filed: Nov. 14, 2000

(30) Foreign Application Priority Data

Nov. 15, 1999 (GB) .............................................. 9926858

(51) Int. Cl.[7] .............................. G06F 11/16; G06F 1/26
(52) U.S. Cl. ............................... 714/14; 714/22; 714/11
(58) Field of Search .............................. 714/14, 22, 11; 713/300, 340

(56) References Cited

U.S. PATENT DOCUMENTS

| | | | | |
|---|---|---|---|---|
| 5,450,285 A | * | 9/1995 | Schlemmer | 361/683 |
| 5,577,205 A | * | 11/1996 | Hwang et al. | 361/683 |
| 5,598,041 A | * | 1/1997 | Willis | 307/43 |
| 5,659,789 A | | 8/1997 | Hausauer et al. | 713/322 |
| 5,664,089 A | * | 9/1997 | Byers et al. | 714/14 |
| 5,745,670 A | * | 4/1998 | Linde | 714/22 |
| 5,784,641 A | | 7/1998 | Sueyoshi et al. | 710/2 |
| 5,848,230 A | * | 12/1998 | Walker | 714/7 |
| 5,909,583 A | * | 6/1999 | Hayes et al. | 713/300 |
| 6,181,549 B1 | * | 1/2001 | Mills et al. | 361/683 |
| 6,189,107 B1 | * | 2/2001 | Kim et al. | 713/300 |
| 6,191,499 B1 | * | 2/2001 | Severson et al. | 307/31 |
| 6,195,754 B1 | * | 2/2001 | Jardine et al. | 713/324 |
| 6,201,319 B1 | * | 3/2001 | Simonelli et al. | 307/26 |
| 6,263,452 B1 | * | 7/2001 | Jewett et al. | 714/9 |
| 6,289,467 B1 | * | 9/2001 | Lewis et al. | 713/340 |
| 6,295,571 B1 | * | 9/2001 | Scardamalia et al. | 710/308 |
| 6,345,369 B1 | * | 2/2002 | Kitamorn et al. | 714/14 |
| 6,392,872 B1 | * | 5/2002 | Doustou et al. | 361/681 |
| 6,449,729 B1 | * | 9/2002 | Sanders et al. | 714/4 |
| 6,542,997 B1 | * | 4/2003 | Rolls et al. | 713/324 |
| 6,597,073 B1 | * | 7/2003 | Check | 307/64 |

FOREIGN PATENT DOCUMENTS

GB          2295057 A     5/1996     ............. H02J/3/38

* cited by examiner

*Primary Examiner*—Scott Baderman
*Assistant Examiner*—Anne L. Damiano
(74) *Attorney, Agent, or Firm*—Davis & Bujold, P.L.L.C.

(57) ABSTRACT

Processor modules (2) are supported side-by-side with one another to slide in and out of a cabinet (1) on tracks (6, 7), each module (2) including a PC-CPU motherboard (11) and a hard-disk unit (16) mounted on a metal plate (3). Power is supplied to all the modules (2) in parallel from two power-supply units (18) mounted in the back of the cabinet (1), each comprising a pair of power-supply modules (19). The pairs of power-supply modules (19) supply power in parallel with one another to the processor modules (2). Diode circuitry (20) is included in each power-supply module (19) to isolate that power-supply module (19) from its paired power-supply module (19) in the event that a fault occurs by which the output voltage of the respective power-supply module (19) fall below that of the power-supply module (19) with which it is paired.

8 Claims, 4 Drawing Sheets

PC-CPU MOTHERBOARDS WITH COMMON FAULT-TOLERANT POWER SUPPLY

This invention relates to computer systems, and is concerned especially with computer systems of the kind that involve the interconnection or clustering of a multiplicity of processors.

BACKGROUND OF THE INVENTION

It is known to form a computing system of the above-specified kind by interconnecting the processing units of a multiplicity of personal computers (PCs) and operating them in parallel with one another; such systems are sometimes referred to as 'Beowulf clusters'. The central processing units (CPUs) of PCs provide significant computing power at relatively-low cost, and advantage has been taken of this to form systems of the above-specified kind having very high computing power comparable with that of a specially-designated supercomputer, at a fraction of the supercomputer-cost. In such systems a multiplicity of PC-CPUs are interconnected and operated in parallel with one another as separate nodes of a local area network. These systems using clustered CPUs require the development of special software to enable parallel operation, and are generally slower than their supercomputer counterparts, but have significant advantage economically.

The CPUs of PCs are not designed to have the extended reliability to be expected of a supercomputer, so computing systems of the known form involving clustered CPUs are, in comparison, susceptible to faults. A fault occurring in an individual CPU will disrupt processing of the current application, and although the application can in general be re-started without replacement of the faulty unit, the disruption and loss of computing time involved is undesirable.

It is one of the objects of the present invention to provided a computer system of the said above-specified kind, which whilst having the potential for cost advantage of the known clustered PC-CPU systems, in less susceptible to fault disruption.

SUMMARY OF THE INVENTION

According to one aspect of the present invention there is provided a computer system of the said above-specified kind wherein power supply to each processor is from a common power-supply means having fault-tolerating redundancy.

The computer system of the present invention may, especially for cost-advantage, utilize processors that are of a form such as used in the context of PC computers. However in accordance with the present invention, rather than powering each processor from its own power-supply unit as in the case of the known form of computer system referred to above utilising PC-CPUs, they are powered from common power-supply means. The power-supply units of PC-CPUs especially, are not designed to have long fault-free operation so the likelihood of a fault arising in any of a multiplicity of clustered PC-CPUs, can be significantly high. The individual power-supply units might be replaced by units with a higher standard of reliability, but it is generally more economical to provide a common power-supply means and invest this with an even higher standard of reliability and, moreover, to include fault-toleration redundancy within it.

The processors of the computer system according to the invention may be carried by individual printed-circuit boards, for example PC motherboards, that are mounted together side-by-side within a rack-mounting. The rack-mounting may be contained within a cabinet together with the power-supply means.

The power-supply means may involve one or more power-supply units each of which comprises a plurality of power-supply modules which operate in parallel with one another in supplying power to the processors. The modules may each include diode or other circuitry that is responsive to the occurrence of a fault within the module (eg reduction in its voltage output in relation to that of the other module) to isolate that module effectively from the processors. Where more than one power-supply unit is involved, they may act in parallel with one another to power all the processors together.

BRIEF DESCRIPTION OF THE DRAWINGS

A computer system in accordance with the present invention will now be described, by way of example, with reference to the accompanying drawings, in which.

DESCRIPTION OF THE PREFERRED EMBODIMENTS

Figure 1:
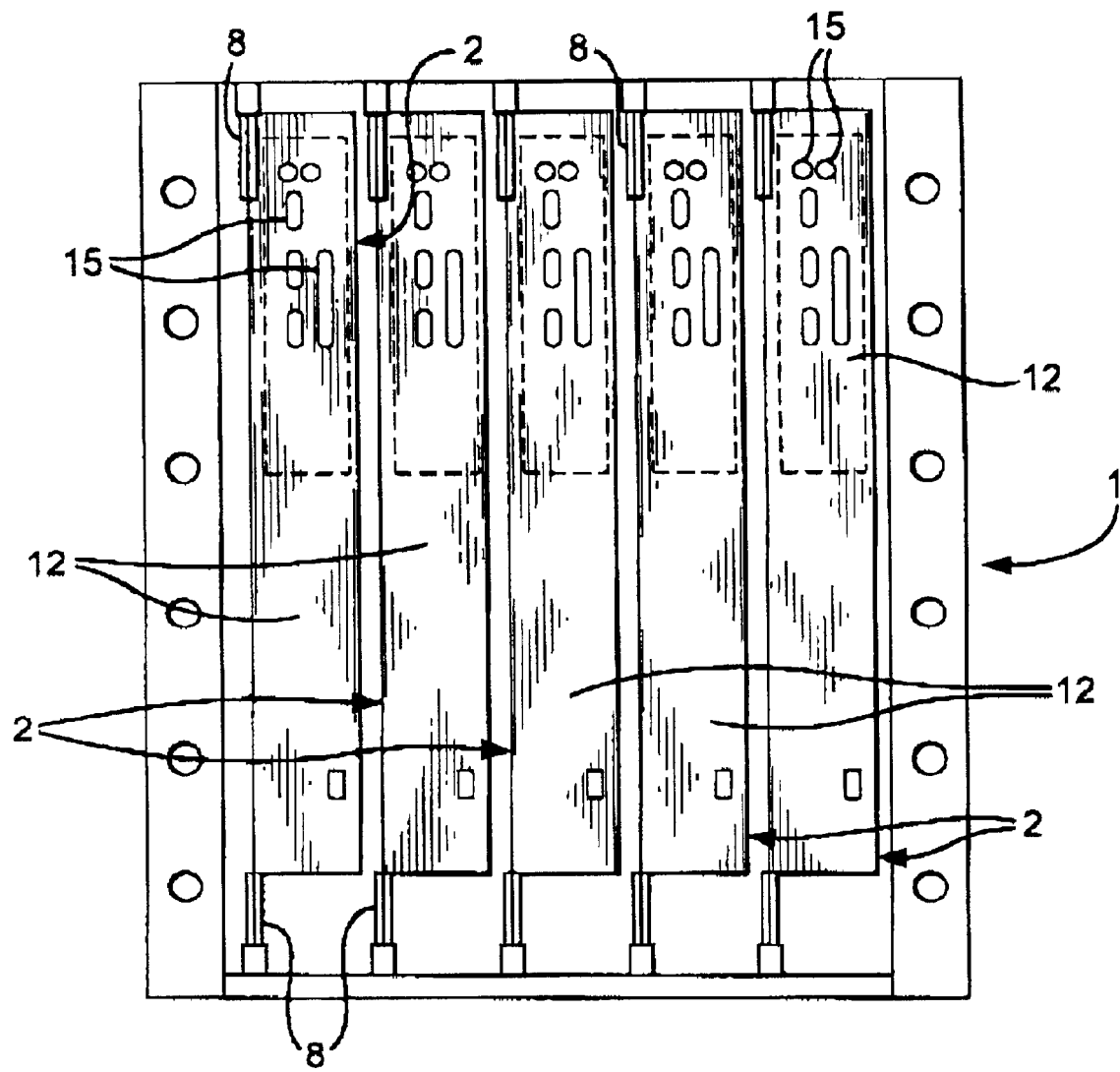
FIG. 1 is a front elevation of the computer system according to the invention, with the front panel of the cabinet housing the system removed.
Figure 2:
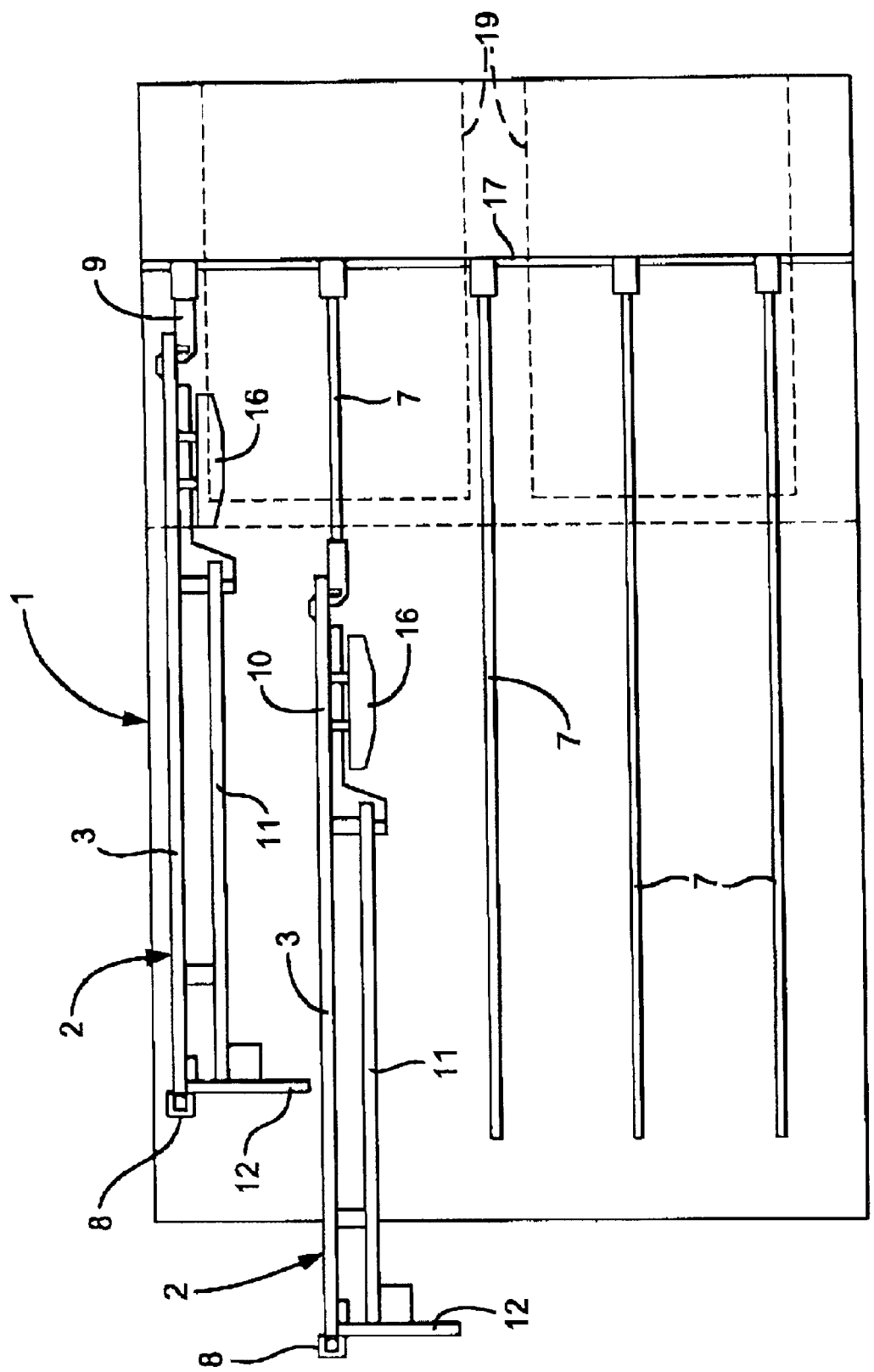
FIG. 2 is a sectional plan of the computer system of FIG. 1 showing only two of its five processing modules with one fully inserted and the other only partially inserted.
Figure 3:
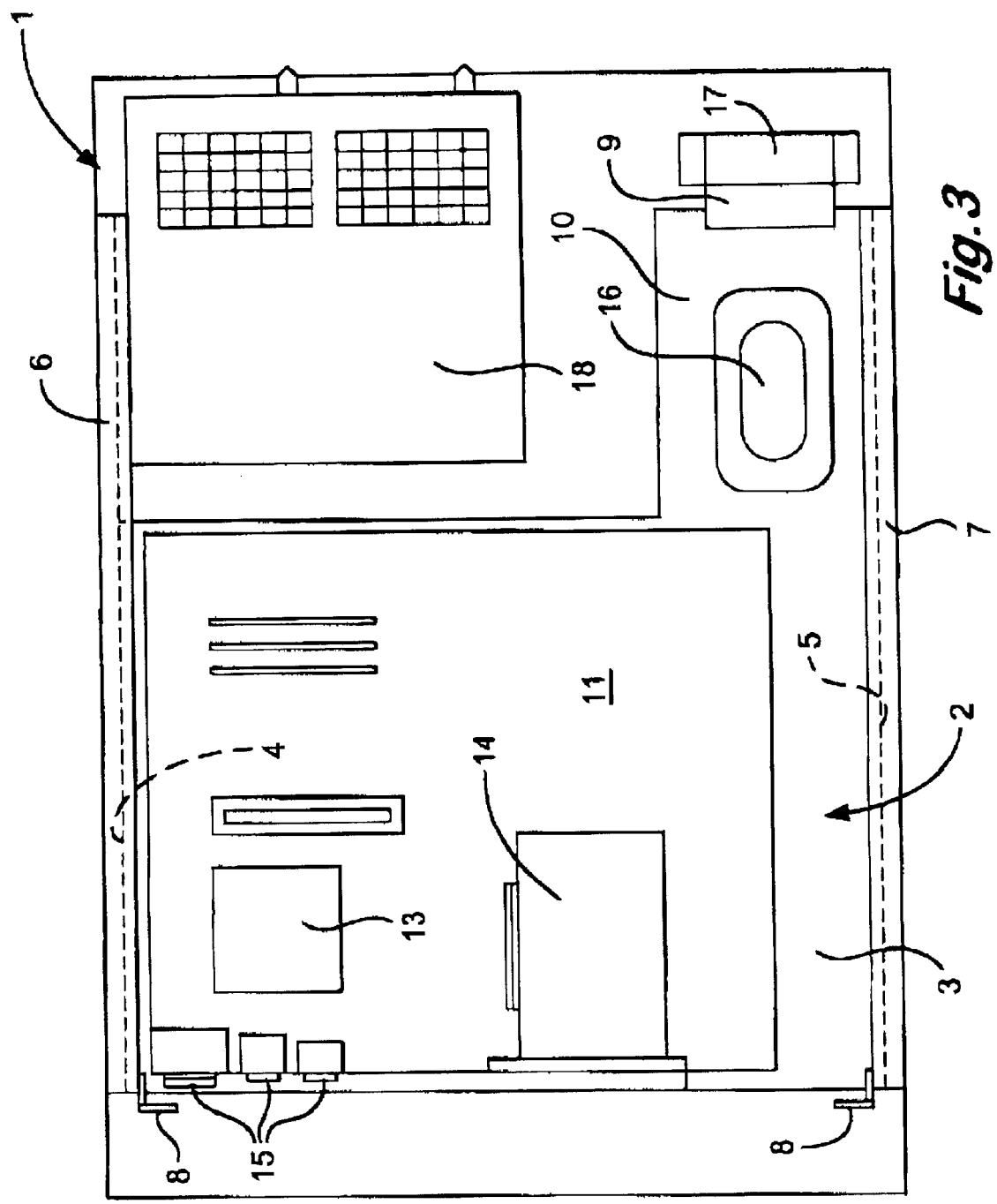
FIG. 3 is a sectional side elevation of the computer system of FIG. 1.

Referring to FIGS. 1 to 3, the computer system of the invention is housed within a standard computer cabinet 1 which contains racking (not shown in detail) for supporting five processor modules 2 side-by-side within the cabinet 1. Each processor module 2 includes an L-shape plate 3 (see FIG. 3) by which it is supported in the cabinet 1, the plate 3 being held upright by engagement of its top and bottom edges 4 and 5 within grooved tracks 6 and 7, respectively, of the racking, so that the module 2 can be readily slid in and out of the cabinet 1 on the tracks 6 and 7. Handles 8 are provided at the front of each module 2 to assist with insertion and withdrawal, and power connection to the module 2 is established when the module 2 is fully inserted, via a two-part plug-and-socket connector 9 (shown as a single block) at the rear of the projecting base-part 10 of the L-shape plate 3.

Each plate 3 carries a PC-CPU motherboard 11 that is mounted in spaced face-to-face relationship with it immediately behind a front-panel 12 of the module 2. This enables data connections to be readily made with its processor 13 and a plug-in network card 14 (see FIG. 3) and other circuitry (not shown) of the motherboard 11, via connectors 15 on the front-panel 12. The motherboard 11 is interconnected by wiring (not shown) for data interchange with a hard-disk unit 16 mounted on the projecting base-part 10 of the plate 3, and is powered along with the unit 16 by connections (not shown) from the connector 9.

Figure 4:
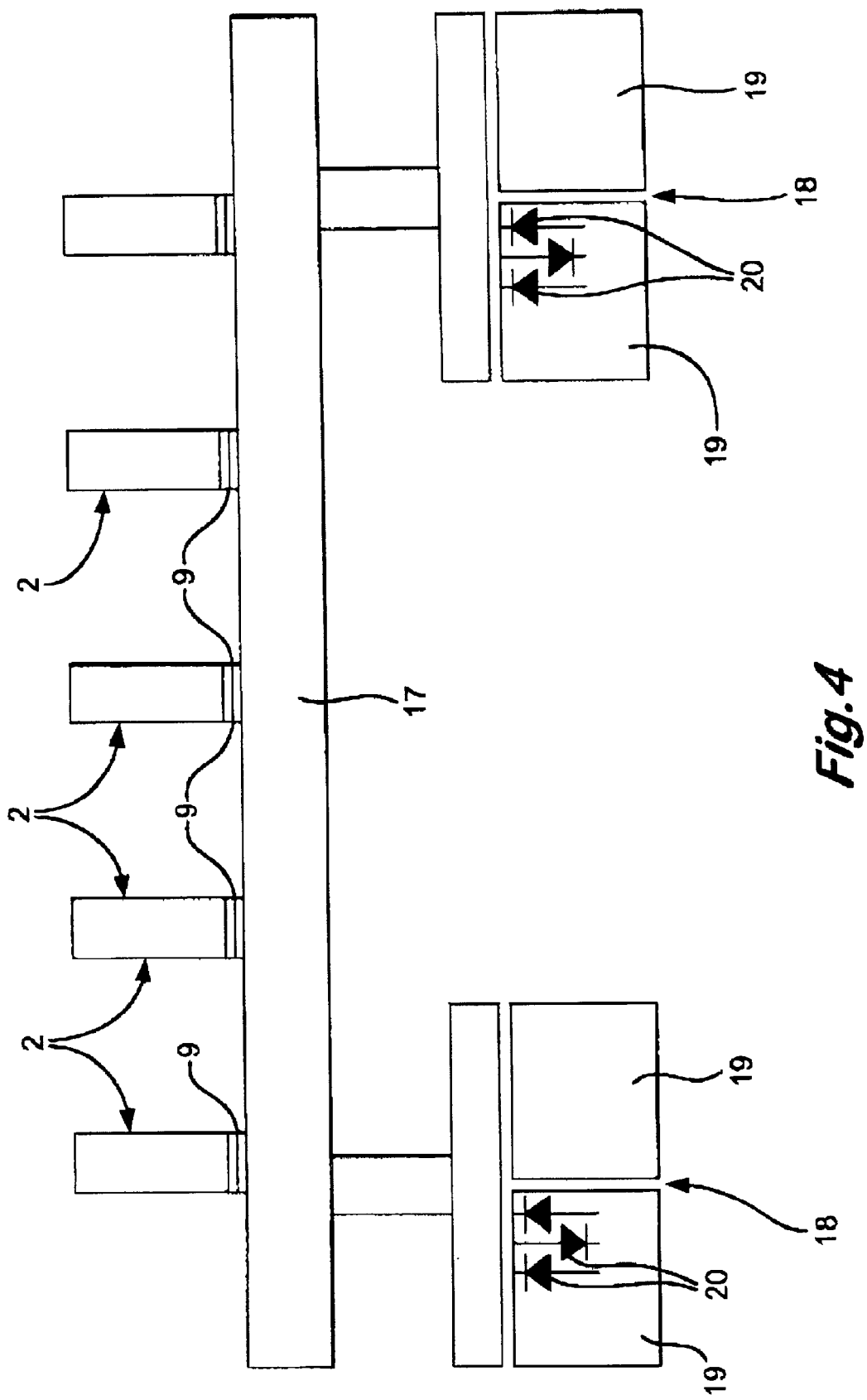
FIG. 4 is a schematic representation of the power distribution circuitry of the computer system of FIG. 1.

Referring also now to FIG. 4, power is supplied to all five processor modules 2 in parallel via a wiring loom 17 which interconnects their connectors 9 with two power-supply units 18. The units 18, which are mounted at the back of the cabinet 1 to lie above the base-parts 10 of the five plates 3, each comprise two, redundant power-supply modules 19. The two modules 19 supply power in parallel with one another, and each includes diode circuitry 20 (indicated in FIG. 4 in the case of one module 19 only). The circuitry 20 is operative to isolate the respective module 19 from its paired module 19 and the loom 17 generally, in the event that a fault occurs by which the voltage output of the module 19 falls so that current would otherwise flow to it rather than from it.

The two units 18 operate in parallel with one another in supplying power to the five processor modules 2, so that the operation in parallel of the four power-supply modules 19 is with a significant degree of redundancy for power-supply fault-survival.

The five processor modules 2 are interconnected via the connectors 15 and network cards 14 by data-cabling (not shown) to operate in parallel with one another as individual nodes of a local-area network and provide a high-powered computing capability. The PC motherboards 11 used, have a high degree of reliability, and that same degree of reliability is afforded to the computer system as a whole by the use of the highly-reliable form of powering adopted.

Although in the above example the modules 2 are operated in parallel, this need not be the case where, for example, a high processor density is required. A high processor density is required for example by internet service providers, when establishing a large number of web servers.

What is claimed is:

1. A computer system comprising:
   a multiplicity of PC-CPU motherboards, each of the multiplicity of PC-CPU motherboards includes a CPU processor having electrical circuitry interconnected with the processor, and a power-input connector connected to the circuitry for use in the supply of electrical power to power the respective motherboard;
   an electrical power-supply means for affording fault-tolerating redundancy for supplying electrical power;
   a mounting means for mounting the motherboards together with the power-supply means as a single unit; and
   a wiring means for connecting the power-supply means n common to the power-input connectors of the motherboards for powering the motherboards in parallel with one another;
   and wherein the power-supply means comprises a plurality of pairs of power-supply modules, means coupling the two power-supply modules of each said pair together for supplying power in parallel with one another and wherein the wiring means couples the pairs of power-supply modules together in parallel with one another for supplying power to the motherboards in parallel.

2. The computer system according to claim 1 wherein each power-supply module includes fault-responsive circuitry for responding to the occurrence of a fault within that respective power-supply module to isolate that individual power-supply module from powering the motherboards.

3. The computer system according to claim 2 wherein the fault-responsive circuitry of each individual power-supply module is responsive to reduction in voltage output of the respective power-supply module to isolate that individual power-supply module from supplying power to the motherboards.

4. A computer system comprising:
   a multiplicity of processor modules each of the multiplicity of processor modules comprises a PC-CPU motherboard and a power-input connector, the PC-CPU motherboard including a CPU processor and electrical circuitry interconnected with the processor, and the power-input connector being interconnected with the PC-CPU motherboard for use in the supply of electrical power to power the PC-CPU motherboard;
   a cabinet housing the processor modules, the cabinet including means mounting the processor modules side-by-side with one another within the cabinet;
   an electrical power-supply means mounted within the cabinet, the power-supply means affording fault-tolerating redundancy in its supply of electrical power; and
   a wiring means within the cabinet for connecting the power-supply means to the power-input connectors of all the processor modules in common for powering the motherboards in parallel with one another;
   wherein the power-supply means comprises a plurality of power-supply modules, and means coupling the power-supply modules in parallel with one another for supplying power to the processor modules in parallel, and wherein the power-supply means comprises a plurality of pairs of power-supply modules, and means coupling the two power-supply modules of each said pair together for supplying power in parallel with one another, and wherein the wiring means couples the pairs of power-supply modules in parallel with one another for supplying power to the processor modules in parallel.

5. The computer system according to claim 4 wherein the means mounting the processor modules within the cabinet comprises a multiplicity of tracks for receiving the processor modules individually, the processor modules being mounted on respective ones of the tracks for sliding movement selectively in and out of the cabinet.

6. The computer system according to claim 4 wherein each processor module includes a hard-disk unit, and the hard-disk unit is interconnected with the PC-CPU motherboard of the respective processor module for data interchange therewith.

7. The computer system according to claim 4 wherein each power-supply module includes fault-responsive circuitry for responding to the occurrence of a fault within that respective power-supply module to isolate that individual power-supply module from supplying power to the processor modules.

8. The computer system according to claim 7 wherein the fault-responsive circuitry of each power-supply module is responsive to reduction in voltage output of the respective power-supply module to isolate that individual power-supply module from supplying power to the processors.

* * * * *